(12) United States Patent
Hardeniya et al.

(10) Patent No.: US 9,460,455 B2
(45) Date of Patent: Oct. 4, 2016

(54) DETERMINING PRODUCT CATEGORIES BY MINING INTERACTION DATA IN CHAT TRANSCRIPTS

(71) Applicant: 24/7 CUSTOMER, INC., Campbell, CA (US)

(72) Inventors: Nitin Kumar Hardeniya, Bangalore (IN); R. Mathangi Sri, Bangalore (IN); Ravi Vijayaraghavan, Bangalore (IN)

(73) Assignee: 24/7 CUSTOMER, INC., Campbell, CA (US)

( * ) Notice: Subject to any disclaimer, the term of this patent is extended or adjusted under 35 U.S.C. 154(b) by 190 days.

(21) Appl. No.: 14/145,570

(22) Filed: Dec. 31, 2013

(65) Prior Publication Data

US 2014/0195562 A1     Jul. 10, 2014

Related U.S. Application Data

(60) Provisional application No. 61/749,120, filed on Jan. 4, 2013.

(51) Int. Cl.
*G06Q 30/02* (2012.01)
*G06N 5/02* (2006.01)
*G06Q 30/00* (2012.01)

(52) U.S. Cl.
CPC .......... *G06Q 30/0256* (2013.01); *G06N 5/022* (2013.01); *G06Q 30/01* (2013.01)

(58) Field of Classification Search
CPC .. G06Q 30/0256; G06Q 10/00; G06Q 30/01; G06N 5/022
USPC ....................................................... 707/776
See application file for complete search history.

(56) References Cited

U.S. PATENT DOCUMENTS

| 6,393,460 | B1 * | 5/2002 | Gruen .................. G06Q 10/107 709/204 |
| 6,618,725 | B1 * | 9/2003 | Fukuda ............. G06F 17/30719 |
| 7,272,509 | B1 * | 9/2007 | Culot ..................... G06Q 30/00 702/22 |
| 7,356,419 | B1 * | 4/2008 | Culot .................... G06F 19/709 702/22 |
| 7,792,889 | B1 * | 9/2010 | Lee ........................ G06Q 10/02 707/948 |

(Continued)

FOREIGN PATENT DOCUMENTS

JP      2009104450 A   *  5/2009
WO    WO 2007/052285 A2     5/2007

OTHER PUBLICATIONS

Ittoo et al., "A Text Mining-Based Recommendation System for Customer Decision Making in Online Product Customization", 2006 IEEE International Conference on Management of Innovation and Technology, pp. 473-477, 2006.*

(Continued)

*Primary Examiner* — Phuong Thao Cao
(74) *Attorney, Agent, or Firm* — Michael A. Glenn; Perkins Coie LLP

(57) ABSTRACT

The propensity and intent of a user to make a purchase is predicted based on product search queries and chat streams. The contents of the data sources, including search queries and chat streams, are analyzed for product names and product attributes. The results of the analyses are used to predict user needs. Product names and attributes are extracted from the data sources. The extracted information is mapped onto abstract product categories. Based on the abstract product categories, offers for products and services are made to the user.

21 Claims, 14 Drawing Sheets

(56) References Cited

U.S. PATENT DOCUMENTS

| | | | |
|---|---|---|---|
| 7,881,984 B2* | 2/2011 | Kane, Jr. | G06F 17/30867 705/26.7 |
| 8,117,064 B2 | 2/2012 | Bourne et al. | |
| 8,335,719 B1* | 12/2012 | Quraishi | G06Q 30/0241 705/14.49 |
| 8,396,741 B2* | 3/2013 | Kannan | G06Q 10/06398 379/265.06 |
| 8,577,753 B1* | 11/2013 | Vincent | G06Q 30/02 705/26.1 |
| 8,935,151 B1* | 1/2015 | Petrov | G06F 17/2705 704/1 |
| 9,002,889 B2* | 4/2015 | Jamthe | G06F 17/30572 707/777 |
| 9,386,107 B1* | 7/2016 | Browning | H04L 67/22 |
| 2002/0059098 A1* | 5/2002 | Sazawa | G06Q 30/0256 705/14.54 |
| 2004/0117383 A1* | 6/2004 | Lee | G06F 17/30286 |
| 2004/0139426 A1* | 7/2004 | Wu | G06F 17/30873 717/120 |
| 2005/0060217 A1* | 3/2005 | Douglas | G06Q 10/063112 705/7.14 |
| 2006/0155765 A1* | 7/2006 | Takeuchi | G06F 17/30654 |
| 2007/0226628 A1* | 9/2007 | Schlack | G06Q 10/10 715/733 |
| 2007/0237361 A1* | 10/2007 | Sandor | G06K 9/00476 382/104 |
| 2008/0077451 A1* | 3/2008 | Anthony | G06Q 10/10 705/4 |
| 2008/0104060 A1* | 5/2008 | Abhyankar | G06F 17/30643 |
| 2008/0201143 A1* | 8/2008 | Olligschlaeger | H04M 3/2281 704/235 |
| 2008/0221870 A1* | 9/2008 | Attardi | G06F 17/2264 704/9 |
| 2008/0235018 A1* | 9/2008 | Eggen | G10L 15/26 704/251 |
| 2009/0006333 A1* | 1/2009 | Jones | G06Q 30/02 |
| 2009/0062681 A1* | 3/2009 | Pradeep | A61B 5/04012 600/544 |
| 2009/0144609 A1* | 6/2009 | Liang | G06F 17/21 715/230 |
| 2009/0222313 A1* | 9/2009 | Kannan | G06Q 30/02 705/7.31 |
| 2009/0319516 A1* | 12/2009 | Igelman | G06Q 30/02 |
| 2010/0017397 A1* | 1/2010 | Koyanagi | G06F 17/30 707/E17.017 |
| 2010/0138282 A1* | 6/2010 | Kannan | G06Q 30/02 705/7.42 |
| 2010/0228733 A1* | 9/2010 | Harrison | G06F 17/30613 707/739 |
| 2010/0332287 A1* | 12/2010 | Gates | G06F 17/277 705/7.32 |
| 2011/0055309 A1* | 3/2011 | Gibor | G06Q 30/02 709/202 |
| 2011/0119050 A1* | 5/2011 | Deschacht | G06F 17/271 704/9 |
| 2011/0153614 A1* | 6/2011 | Solomon | B65G 1/127 707/740 |
| 2011/0161431 A1* | 6/2011 | Jagannathan | G06Q 10/10 709/206 |
| 2011/0179114 A1* | 7/2011 | Dilip | G06F 17/30867 709/204 |
| 2011/0206198 A1* | 8/2011 | Freedman | G06Q 30/06 379/265.03 |
| 2011/0238410 A1 | 9/2011 | Larcheveque et al. | |
| 2011/0238674 A1* | 9/2011 | Avner | G06F 17/30734 707/748 |
| 2011/0246920 A1 | 10/2011 | Lebrun | |
| 2011/0252343 A1* | 10/2011 | Broman | G06F 17/30864 715/760 |
| 2012/0076283 A1* | 3/2012 | Ajmera | G06Q 10/10 379/93.17 |
| 2012/0102121 A1* | 4/2012 | Wu | G06F 17/30705 709/206 |
| 2012/0130771 A1 | 5/2012 | Kannan et al. | |
| 2012/0173981 A1* | 7/2012 | Day | G06F 3/04817 715/719 |
| 2012/0179551 A1* | 7/2012 | Georgakis | G06Q 30/0267 705/14.64 |
| 2012/0209879 A1* | 8/2012 | Banerjee | G06F 17/30696 707/776 |
| 2012/0215640 A1 | 8/2012 | Ramer et al. | |
| 2012/0240177 A1* | 9/2012 | Rose | H04N 21/252 725/116 |
| 2012/0266258 A1* | 10/2012 | Tuchman | H04L 63/104 726/28 |
| 2012/0278159 A1* | 11/2012 | Kumar | G06Q 30/0241 705/14.42 |
| 2012/0330961 A1* | 12/2012 | Miao | G06F 17/30707 707/740 |
| 2013/0006952 A1* | 1/2013 | Wong | G06F 17/30867 707/706 |
| 2013/0060871 A1* | 3/2013 | Downes | H04L 51/04 709/206 |
| 2013/0089848 A1* | 4/2013 | Exeter | G09B 7/00 434/350 |
| 2013/0136253 A1* | 5/2013 | Liberman Ben-Ami | H04M 3/5191 379/265.09 |
| 2013/0185307 A1* | 7/2013 | El-Yaniv | G06F 17/2785 707/748 |
| 2013/0282595 A1* | 10/2013 | Vijayaraghavan | G06Q 30/016 705/304 |
| 2013/0287187 A1* | 10/2013 | Gandhe | G06F 17/2745 379/93.17 |
| 2013/0307997 A1* | 11/2013 | O'Keefe | H04L 51/10 348/207.1 |
| 2013/0347018 A1* | 12/2013 | Limp | H04N 21/4826 725/19 |
| 2014/0074951 A1* | 3/2014 | Misir | H04L 12/1827 709/206 |
| 2014/0082106 A1* | 3/2014 | Scherpa | H04L 12/1831 709/206 |
| 2014/0150016 A1* | 5/2014 | Feng | H04N 21/4788 725/34 |
| 2014/0195562 A1* | 7/2014 | Hardeniya | G06Q 30/0256 707/776 |
| 2014/0195621 A1* | 7/2014 | Rao DV | H04L 51/02 709/206 |
| 2014/0344052 A1* | 11/2014 | Seals | G06Q 30/0253 705/14.51 |
| 2014/0351078 A1* | 11/2014 | Kaplan | G06Q 30/0631 705/26.7 |
| 2014/0379524 A1* | 12/2014 | Grimaud | G06Q 30/0613 705/26.41 |
| 2015/0254349 A1* | 9/2015 | Sela | G09B 5/125 707/770 |

OTHER PUBLICATIONS

Loh et al., "Recommendation of Complementary Material During Chat Discussions", Knowledge Management & E-Learning: An International Journal, vol. 2, No. 4, pp. 385-399, 2010.*

Vijayaraghavan et al., "Applications of Data Mining and Machine Learning on Online Customer Care", Industry Practice Expo Invited Talk, KDD '11, Aug. 21-24, 2011, San Diego, California, USA, pp. 779 (1 page).*

Dorre et al., "Text Mining: Finding Nuggets in Mountains of Textual Data," In Proceedings of the Fifth ACM SIGKDD International Conference on Knowledge Discovery and Data Mining, pp. 398-401, 1999.*

Edelstein et al., "Building Profitable Customer Relationship with Data Mining," SCN Education B.V. (ed.), Customer Relationship Management, pp. 339-351, 2000.*

Evangelopoulos et al., "Text-Mining the Voice of the People," Communication of the ACM, vol. 55, Issue 2, Feb. 2012, pp. 62-69.*

(56) References Cited

OTHER PUBLICATIONS

Kontostathis et al., "Text Mining and CyberCrime," In Text Mining: Applications and Theory (Eds M.V. Berry and J. Kogan), John Wiley & Sons, Ltd, Chichester, UK, 14 pages, 2010.*

Lakshminarayan et al., "Improving Customer Experience via Text Mining," S. Bhalla (Ed.): DNIS 2005, LNCS 3433, pp. 288-299, 2005.*

* cited by examiner

FIG. 12

DETERMINING PRODUCT CATEGORIES BY MINING INTERACTION DATA IN CHAT TRANSCRIPTS

CROSS REFERENCE TO RELATED APPLICATIONS

This application claims priority to U.S. provisional patent application Ser. No. 61/749,120, filed Jan. 4, 2013, which application is incorporated herein in its entirety by this reference thereto.

BACKGROUND OF THE INVENTION

1. Technical Field

The invention relates to text mining. More particularly, the invention relates to text mining during chat sessions to determine appropriate product categories.

2. Description of the Background Art

Data sources, such as chat transcripts, e-mails, surveys, and so on, are used to predict a customer's behavior and preferences. Chat categorization provides insights into customer needs by grouping the chats. Effective chat categorization helps to formulate policies for customer retention and target marketing in advance.

It would be advantageous to mine a chat transcript to identify the product that the customer mentions during a chat session. Once the product is mined, it can be assigned to an abstract product category. Such product categories, and other information in the chat session itself, could provide unique insights for some voice of the customer (VoC) analytics. Product categorization can also play a pivotal role in agent recommendation because it provides enormous opportunities with regard to personalization and providing recommendations to the agent or the customer. Unfortunately, the extraction of product names and product related features from a chat session transcript is difficult due to the inherent ambiguity provided by chat as a medium.

SUMMARY OF THE INVENTION

Embodiments of the invention predict the propensity and intent of a user to make a purchase, based on product search queries and chat streams. The contents of the data sources, including search queries and chat streams, are analyzed for product names and product attributes. The results of the analyses are used to predict user needs. Product names and attributes are extracted from the data sources. The extracted information is mapped onto abstract product categories. Based on the abstract product categories, offers for products and services are made to the user.

BRIEF DESCRIPTION OF THE DRAWINGS

Figure 12:
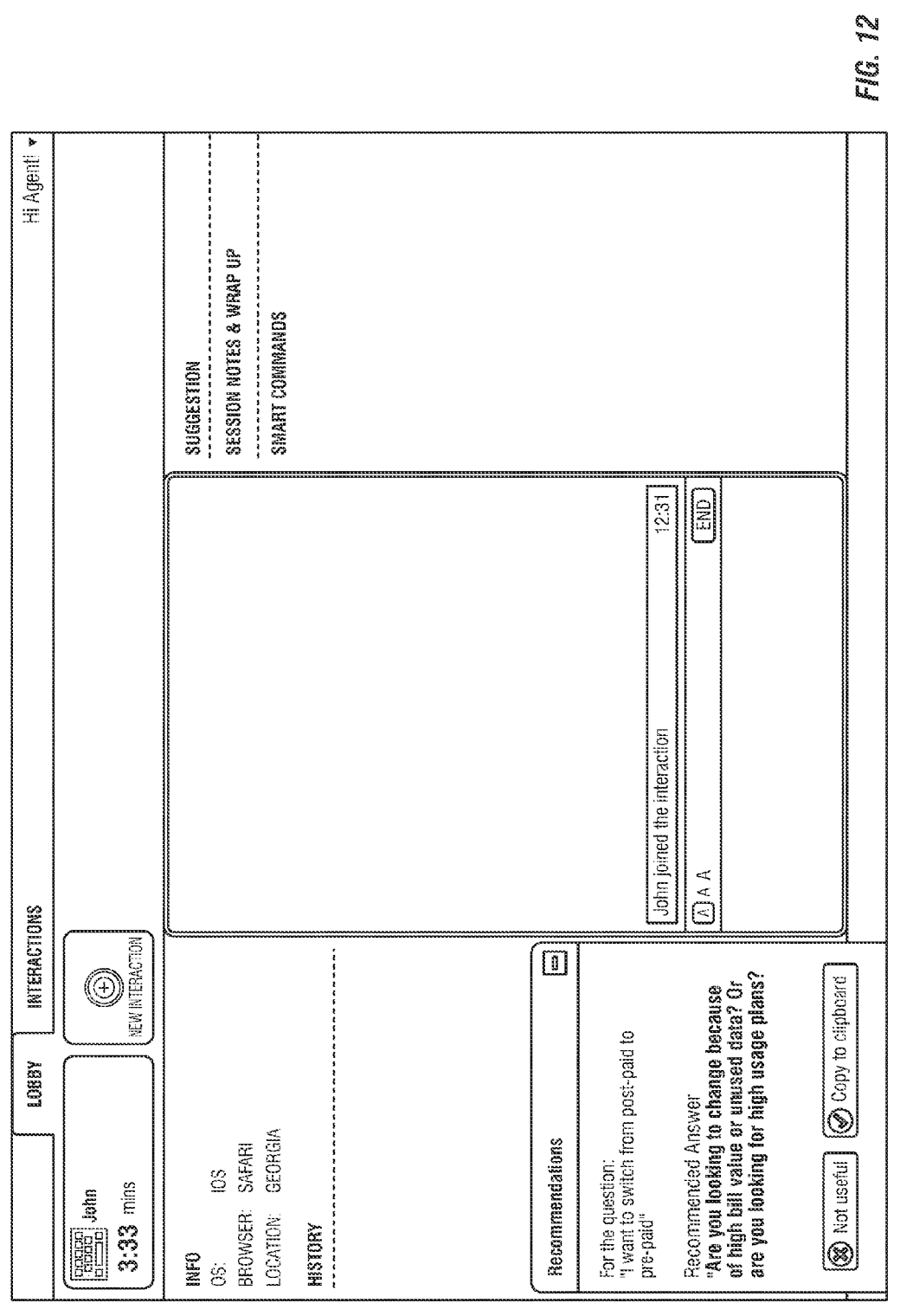

FIGS. 10-14 are mock-ups are user/agent interactions showing positioning (FIG. 10), the recommendation being docked at the beginning of the chat (FIG. 11), the window sliding to show a recommendation after location a trigger (FIG. 12), the interaction being marked as useful (FIG. 13), and docking post-validation, all according to the invention.

DETAILED DESCRIPTION OF THE INVENTION

Voice of the Customer (VoC) analytics describe a process by which customer preferences, expectations, aversions, queries, etc. are captured in a structured manner. With regard to business intelligence, VoC analytics offer a technique to produce a hierarchical structure that contains customer wants and needs. The hierarchical structure is then used to predict user purchase needs and intent.

Embodiments of the invention extract keywords from various user communication channels, including search queries, survey comments, Web interaction data, chat streams, and so on. The keywords, which include product types and key attributes, are mapped onto abstract product categories. For example, typical product categories for cellphone products are: cellphones with touchscreens, cellphones with high battery life, iPhone, Samsung Galaxy, $100 Plan, $200 Plan, etc. Inferences are made from the product categories and key attributes and features related to the categories. Recommendations are then made to the user regarding products and services that are available. For example, if a particular product is out of stock, a recommendation is made to the customer service representative or the user for a best alternate product having similar product attributes to the original product of interest to the customer, or to attributes in which the customer has expressed an interest.

In particular, embodiments of the invention relate to product categorization in chat transcripts to understand the customer's propensity to purchase a particular product or service.

In embodiments of the invention, product categorization comprises three stages:

Initially, product extraction by text mining is performed to extract the product identity and product related information from chat transcripts.

Next, the relevant information extracted from the chat transcript is mapped to an abstract product category.

Figure 1:
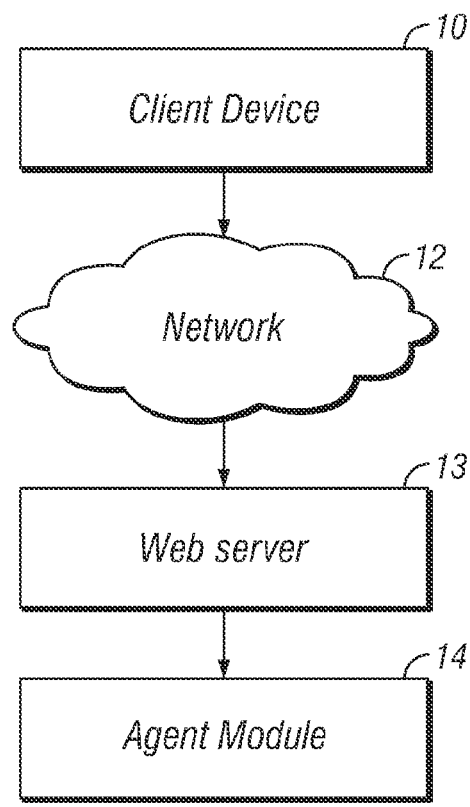
FIG. 1 is a block diagram showing a client-server-based network architecture that determines appropriate categories according to the invention.

Finally, the related information is text mined for the same chat conversation and a knowledge base is provided for making recommendations to the customer or agent. It also provides list of product features or product explanations to the user FIG. 1 is a block diagram showing a client-server-based network architecture that determines appropriate categories according to the invention. Embodiments of the invention determine product categories by mining interaction data through one of the several channels available to customer, including but not limited to, chat transcripts, Web interactions, interaction via a mobile device, IVR, survey data, agent comments, etc. For purposes of the discussion herein, interaction data is data that relates to all aspects of interaction between the client device 11 and the agent module 14 through all channels that have occurred.

As discussed above, embodiments of the invention comprise three steps, i.e. product extraction, product-to-category mapping, and an application stage.

At the application stage agents are given recommendations about the product, e.g. features, benefits, etc. in real time when interaction with the user occurs, or agents can be trained based on the knowledge mined from such interactions. Product related context discussed in chat can also be passed to other channels, such as IVR, voice, online, etc.

As shown in FIG. 1, a client device 11 is connected to a network 12, e.g. a networked system. The network 12 is coupled through a Web server 13 which connects to the agent module 14.

Those skilled in the art will appreciate that other system and network architectures may be used in connection with the practice of the herein disclosed invention. In an embodiment of the invention, the network 12 can be a suitable communication network, such as the Internet, a wireless network, a cellular network, or a wide area network (WAN) which is capable of communicating with one or more client devices 11.

In an embodiment of the invention, the client device 11 can be any of mobile phone, desktop computer, laptop, tablet, or any other communication device that may be used to access the network 12.

The agent module 14 refers to any of a human agent, an automated agent, or any other mechanism which is capable of interacting with the client device 11.

Typically, chat communications involve an instantaneous or near instantaneous communication between two or more users, where each user may transmit, receive, and display communicated information. In an embodiment of the invention, the client device 11 communicates with the agent module 14 through the network 12 and the Web server 13. During the course of communication with the agent module 14, the client device 11 describes or discloses certain product related features, product names, or any other product relevant information. This information is contained in any one of the several formats for storing customer interaction history, namely, a transcript of the chat session, Web interaction data, customer survey data, agent survey data, etc. The Web server 13 records, stores, or captures the relevant information disclosed by the client device 11.

Figure 2:
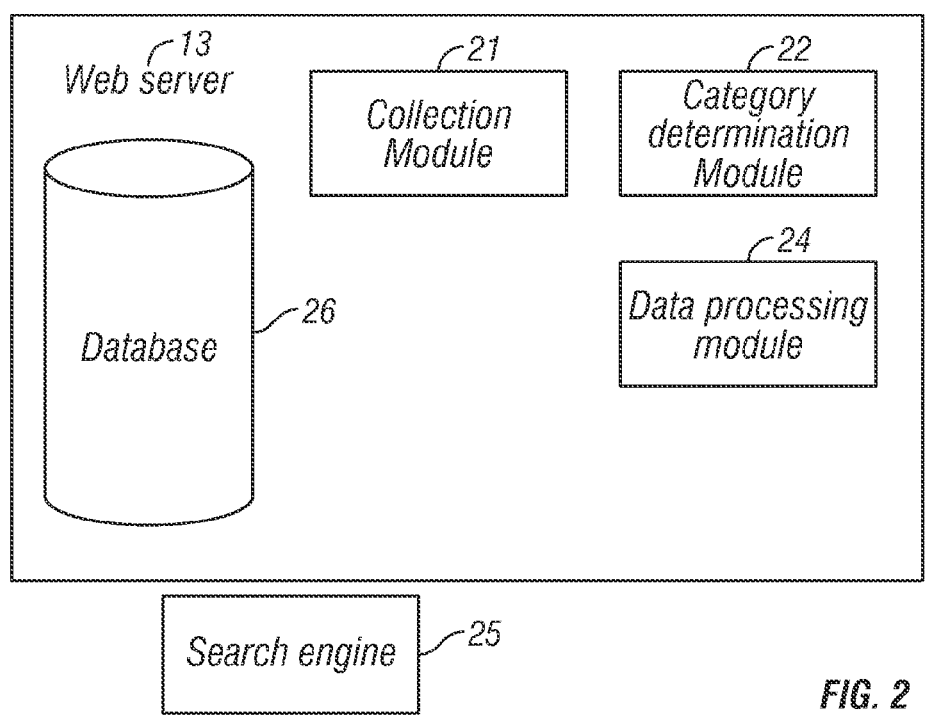
FIG. 2 is a block diagram showing the components of a Web server according to the invention.

FIG. 2 is a block diagram showing the components of a Web server according to the invention. As shown in FIG. 2, the Web server 13 comprises a collection module 21, category determination module 22, data processing module 24, and a database 26.

In embodiments of the invention, tracking results from the search engine 25 are fed into the collection module 21. The collection module 21 collects the historical data set recorded by, and received by, one or more search engines. For example, a user may enter a query comprising the keyword "mobile" and specify a category "Android Handsets." The user then selects others aspects of brand and camera specifications and continues to browse resulting publications. In this example, the keywords, specified categories, and selection of various aspects are tracked by the search engine 25, Web, chat, or any other interaction history logged by the Web server 103, client device 101, agent module 104, or any other communications channel, and collected by the first collection module 21. For example, typical product categories for cellphones products are cellphones with touchscreens, cellphones with high battery life, iPhone, Samsung Galaxy, $100 Plan, $200 Plan, etc. Search results and the agent interactions are tied together by a Web session id, or they could be tied together by a user id captured via these channels The category determination module 22 manages the determination of appropriate categories, and query aspects for each category. The query is a feature set derived from interaction history of the client device with the agent module or the webserver. Further, the category determination module 22 identifies one or more appropriate categories to associate with a query, and it may choose a suitable category threshold for selecting appropriate categories. The category is determined for the chats in the collection module. The query is made during a chat session. Threshold is a probability value. For example, if the user enters a line stating "I am looking for a washer," this could result in probability values, e.g. 0.0663 for the washer category and 0.5332 for dishwasher category. Typically, the category that has the highest probability value is chosen as the category for that line A data processing module 24 processes the collected historical data set from the collection module 21.

The determined appropriate categories and top number of key words and tags associated with a search query may be stored in a database 26. The database 26 may be used for a lookup upon receiving a new query.

Figure 3:
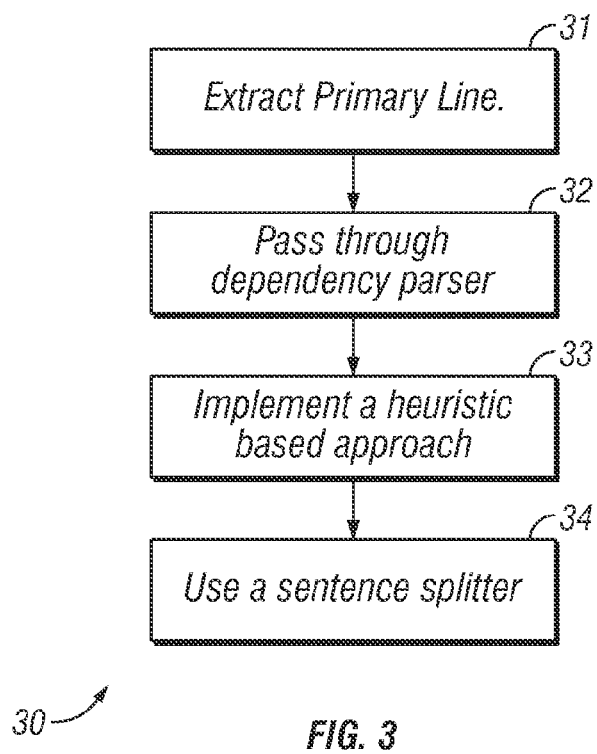
FIG. 3 is a flow diagram showing product extraction in product categorization according to the invention.

FIG. 3 is a flow diagram showing product extraction in product categorization according to the invention. In an embodiment of the invention, the process of determining the categories of products in a sales or service chat session is a key factor to extract. In a sales session, the user propensity to purchase or obtain the goods and/or services is identified by building a model that learns from the interaction history, and using the model to predict the user propensity to purchase or obtain services. The next factor is to identify what the customer wants to purchase or obtain or what service regarding the product for which the customer is asking or querying. Product name and related information is an important attribute to capture the customer's need in a sales domain.

Typically, the primary line which occurs at the initiation of a chat session, apart from the greetings, during interaction between the client device 11 and the agent module 14 tends to reveal the important issues in the chat session. Therefore, initially the primary line is extracted 31 from the collection module 21 which comprises data regarding the interaction between the client device 11 and the agent module 14. The extracted primary line is passed 32 through a dependency parser which, in turn, outputs a parsed tree (see, also, FIG. 6). Based on the parsed tree, a heuristic based approach is implemented 33 to extract the product name or other such relevant information as may be required.

In the case of performance enhancements, a sentence splitter 34 may be used as a pre-processing step, which splits or segments a given text into sentences. Various other processing steps may be also performed on the extracted product name to remove irrelevant, inaccurate, or non-informative words. Therefore, processing steps, such as stop-word removal, spelling correction, and domain specific word removal, are implemented, by the category determination module 22, to obtain cleaner product related information. The various steps in product extraction 30 may be performed in the order presented, in a different order or simultaneously. Further, in some embodiments, some actions listed in FIG. 3 may be omitted.

Figure 4:
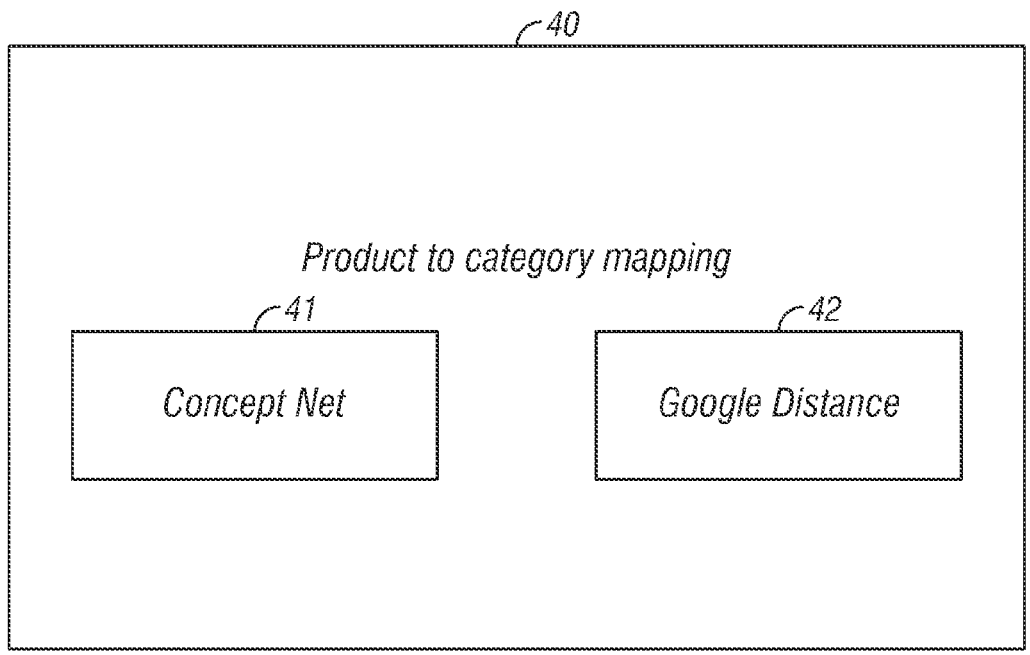
FIG. 4 is a block diagram showing product-to-category mapping according to the invention.

FIG. 4 is a block diagram showing an embodiment for product-to-category mapping according to the invention. Once the product name and other product relevant information is extracted from a chat session, the information must be mapped to an abstract product category to provide significant insights that can be used to produce an actionable recommendation by the category determination module 22. Further, some of the specific domains comprise entities that can be mapped through an ontology, such as ConceptNet. ConceptNet is a rich ontology with a rich semantic relation set that provides different ontological relations, such as 'parts of' and 'conceptually related to.' These relations are used by the category determination module 22 to map the product name, part, and information to product categories.

Figure 5:
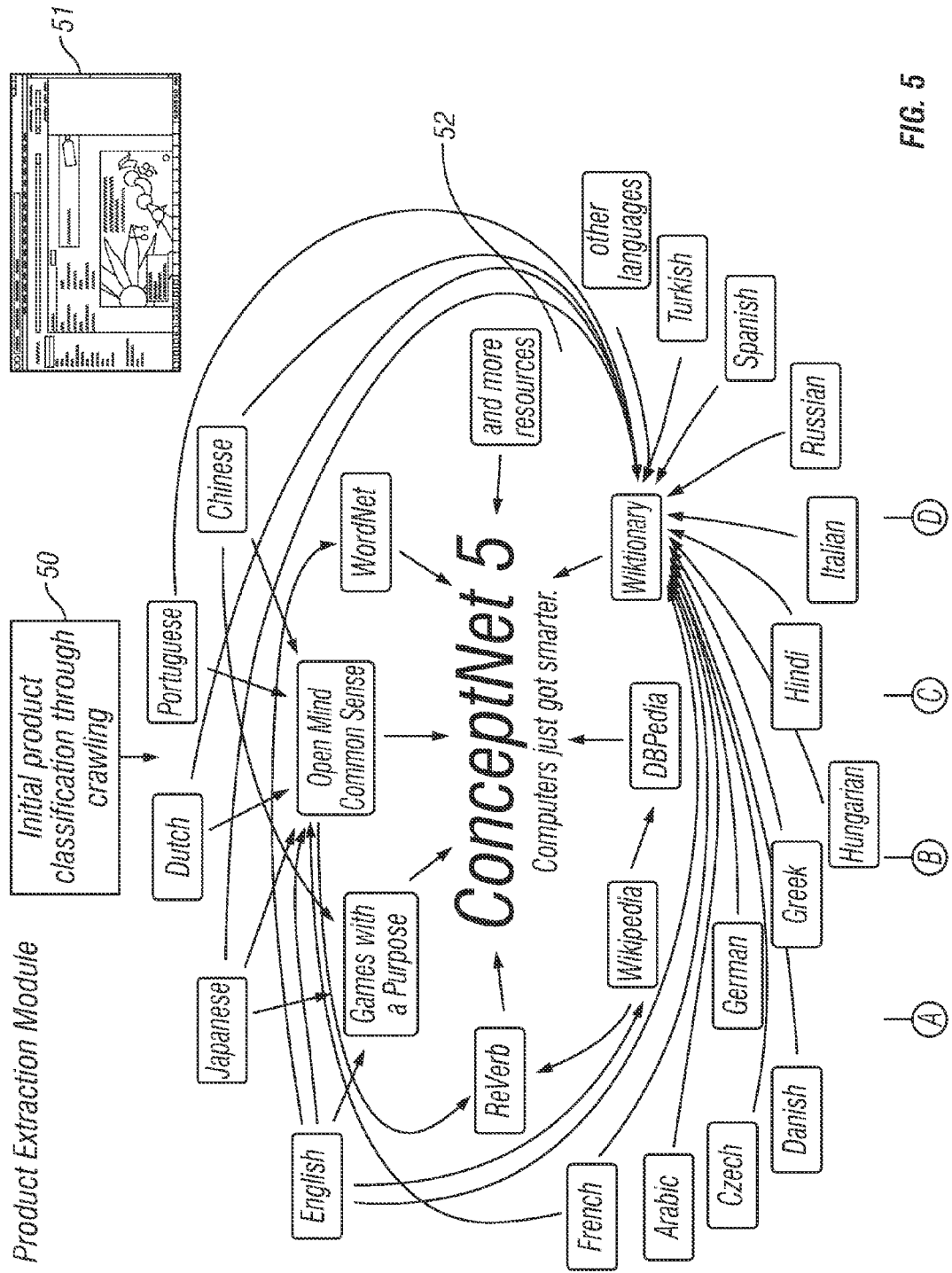
FIG. 5 is a block schematic showing product extraction according to the invention.
Figure 5:
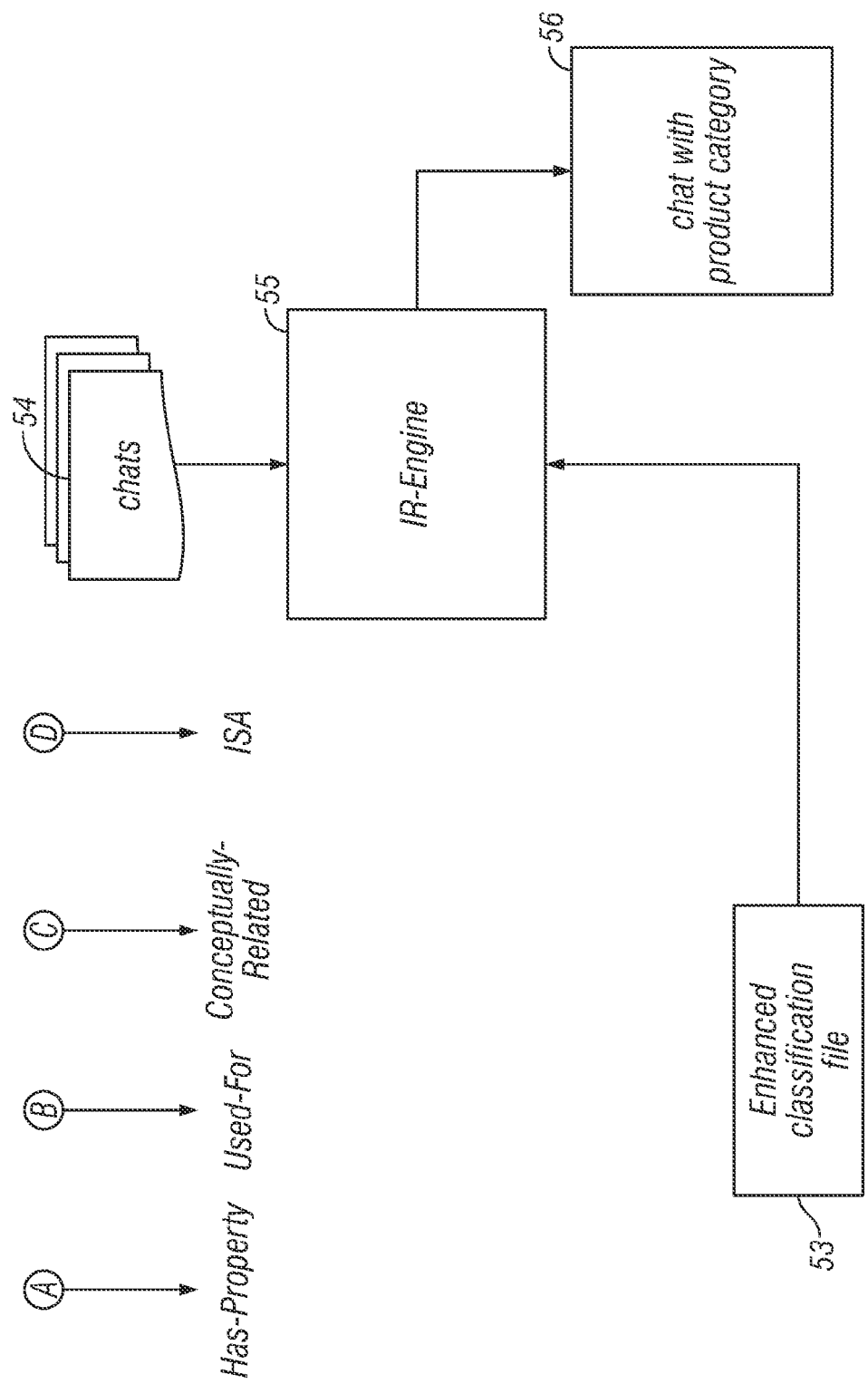

FIG. 5 is a block schematic showing product extraction according to the invention. In FIG. 5, a user performs a search 51. An initial product classification is performed through crawling 50. The classification is mapped through an ontology 52 to produce an enhanced classification file 53. Chats 54 are text mined and applied to the enhanced classification file in an IR-engine 55 and a chat with a product category 56 is output.

Those skilled in the art will appreciate that the use of ConceptNet is described herein for the purposes of illustration, and any other suitable source of semantics and semantic relations can be used to practice the herein disclosed invention.

To map a product name to a product category, a family of semantic distance measures, such as Normalized Google Distance (NGD), Wiki distance, Bing distance, etc. may also be used. NGD is a semantic similarity measure derived from the number of hits returned by the Google search engine for a given set of keywords. Keywords having the same or similar meaning in a natural language sense tend to be close in units of Google distance, while words with dissimilar meanings tend to be farther apart. In embodiments of the invention, NGD is used to calculate the semantic relatedness and this relatedness contributes to the mapping between the product name and the product category in the category determination module 22. Those skilled in the art will appreciate that the use of NGD is described herein for the purposes of illustration, and any other suitable source of semantics distance measures can be used to practice the herein disclosed invention.

Normalized Google Distance is given by:

$$NGD(x, y) = \frac{\max\{\log f(x), \log f(y)\} - \log f(x, y)}{\log M - \min\{\log f(x), \log f(y)\}} \quad (1)$$

where M is the total number of Web pages searched by Google; f(x) and f(y) are the number of hits for search terms x and y, respectively; and f(x, y) is the number of Web pages on which both x and y occur (see Wikipedia, Normalized Google Distance).

For pages other than the first page, it is necessary to start at the top of the page and continue in a double column format. Further, the two columns on the last page should be as close to equal length as possible.

Figure 6:
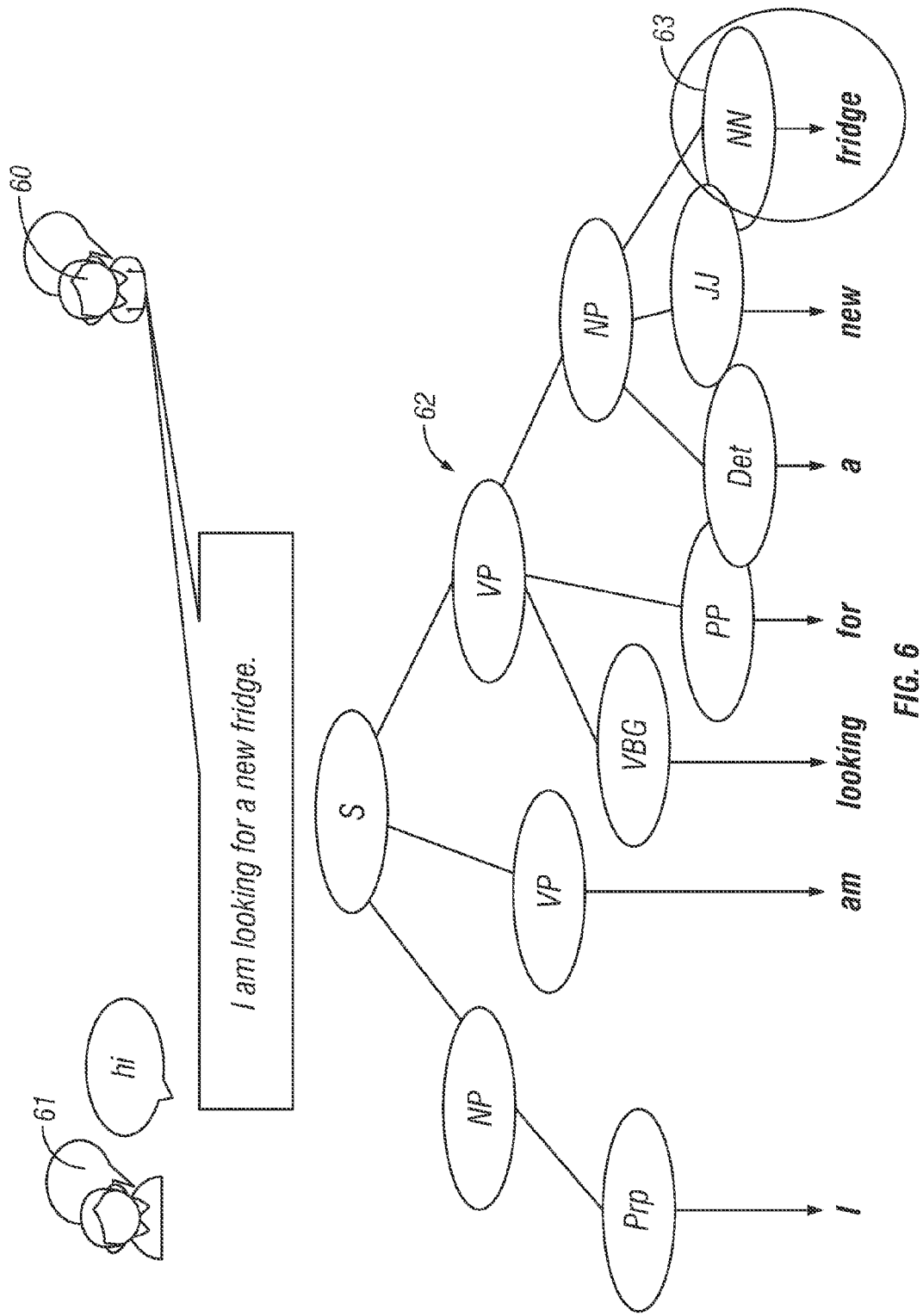
FIG. 6 is a flow diagram showing the use of semantic distance according to the invention.

FIG. 6 is a flow diagram showing the use of a dependency parser for product extraction according to the invention. In FIG. 6, a user 60 engaged in a chat session with an agent 61 indicates that he is looking for a new fridge. After dependency parsing and application of heuristic rules, the product is extracted 63. After semantic distance processing, as shown in FIG. 7, the product and/or product category is extracted 71.

Figure 7:
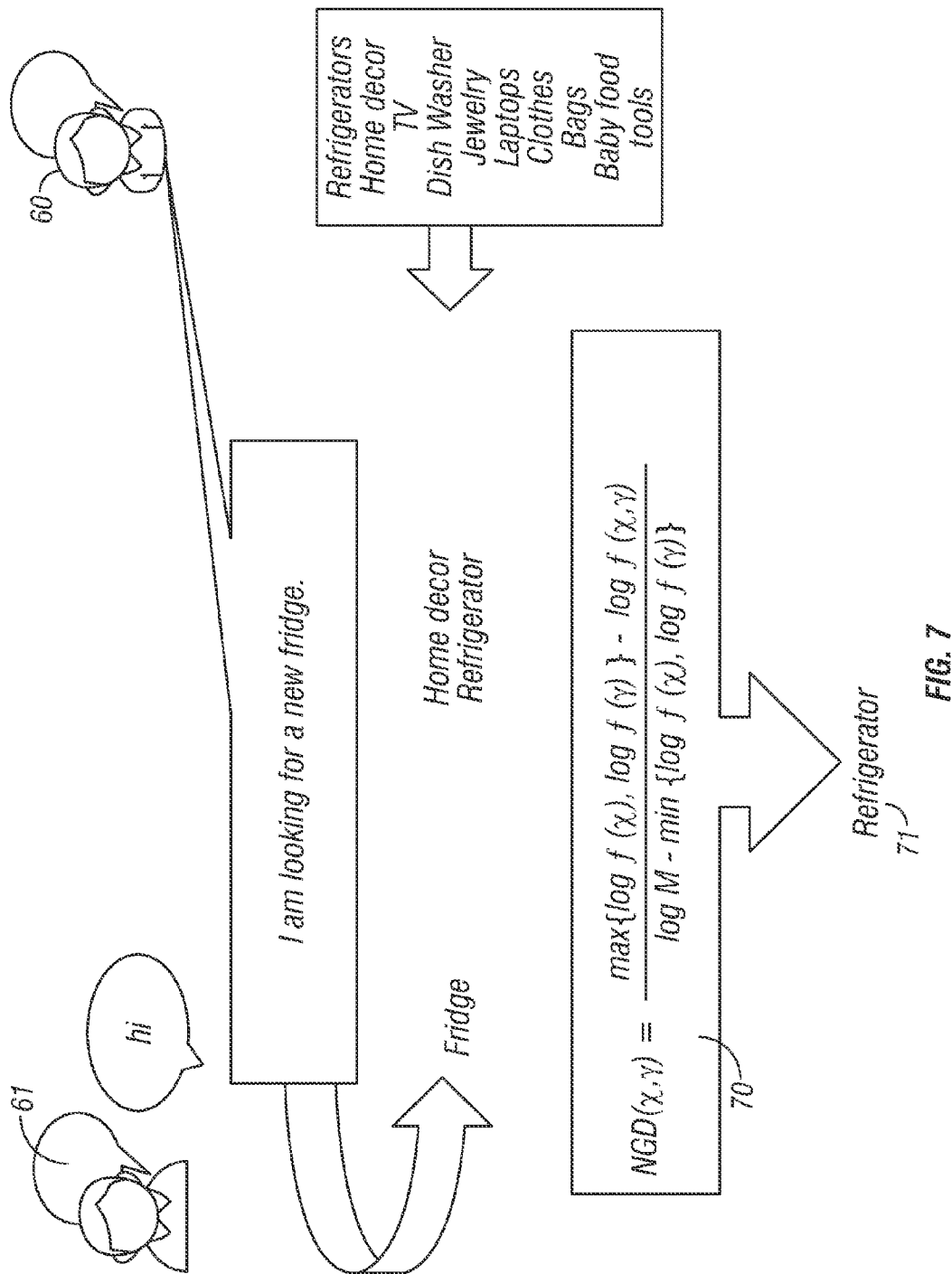
FIG. 7 is a flow diagram showing the use of an NGD function according to the invention.

FIG. 7 is a flow diagram showing the use of an NGD function according to the invention. In FIG. 7, a user 60 engaged in a chat session with an agent 61 indicates that he is looking for a new fridge. After application of the NGD function 70, the product and/or product category 71 is extracted.

Figure 8:
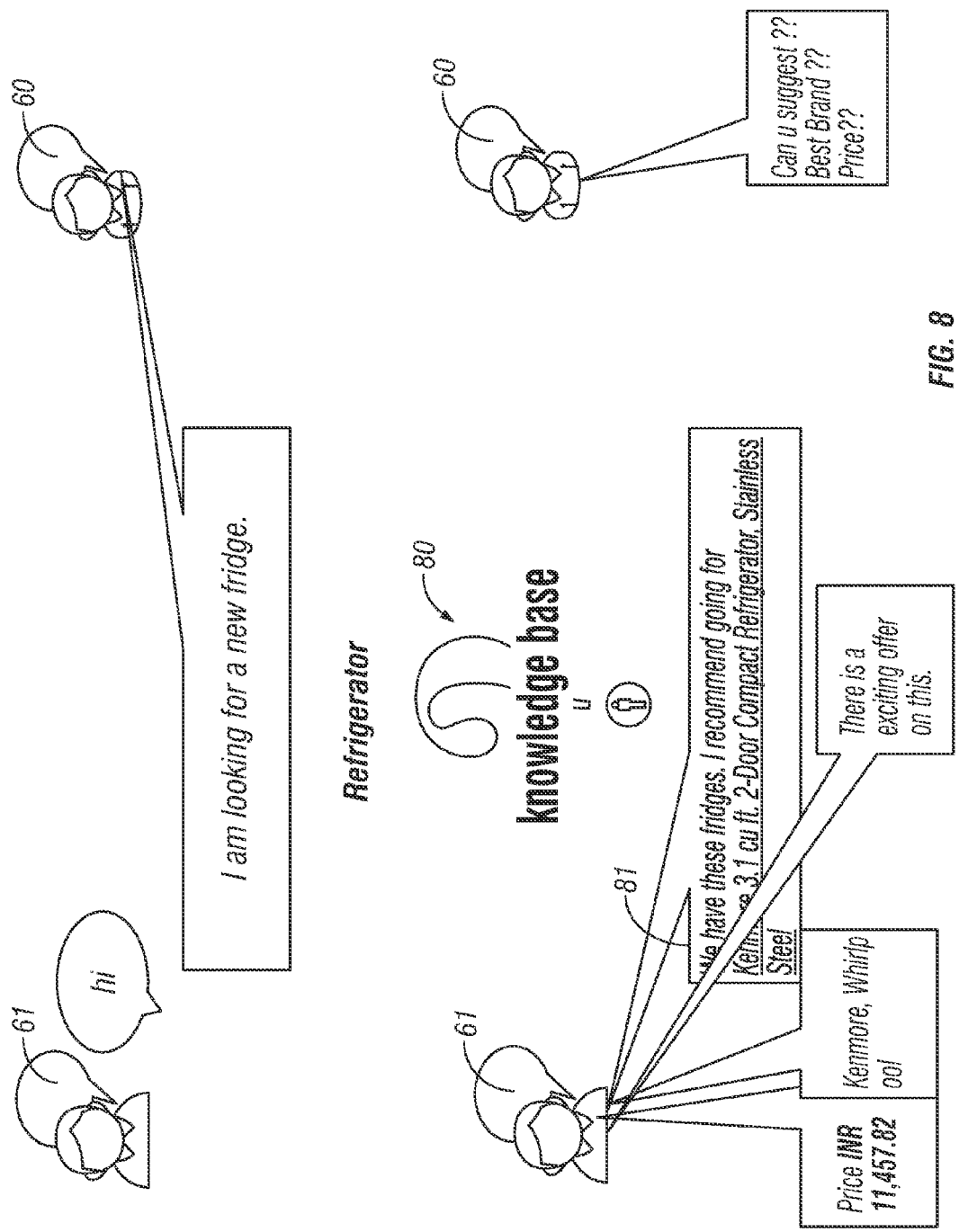
FIG. 8 is a flow diagram showing the use of a knowledge base according to the invention.

FIG. 8 is a flow diagram showing the use of a knowledge base according to the invention. In FIG. 8, a user 60 engaged in a chat session with an agent 61 indicates that he is looking for a new fridge. After consulting the knowledge base 80, the agent is able to provide useful information 81 to the user.

Table 1 below indicates different proof of concept (POC's) and map or similarity scores determined by application of concept net distance or normalized google distance. Table 1 shows results of various POC's and the performance evaluation. In embodiments of the invention, the algorithm applied, namely using semantic similarity scores, establishes the efficiency of the herein disclosed invention on various domains as well as accounts. Embodiments of the invention also provide agent recommendations. The real time text mining capability is also used for leveraging the overall consumer experience.

TABLE 1

| Proof of Concept | | |
|---|---|---|
| POC's | MAP @ 5 | MAP @ 10 |
| Concept Net | 0.7 | 0.732 |
| NGD | 0.77 | 0.89 |

Figure 9:
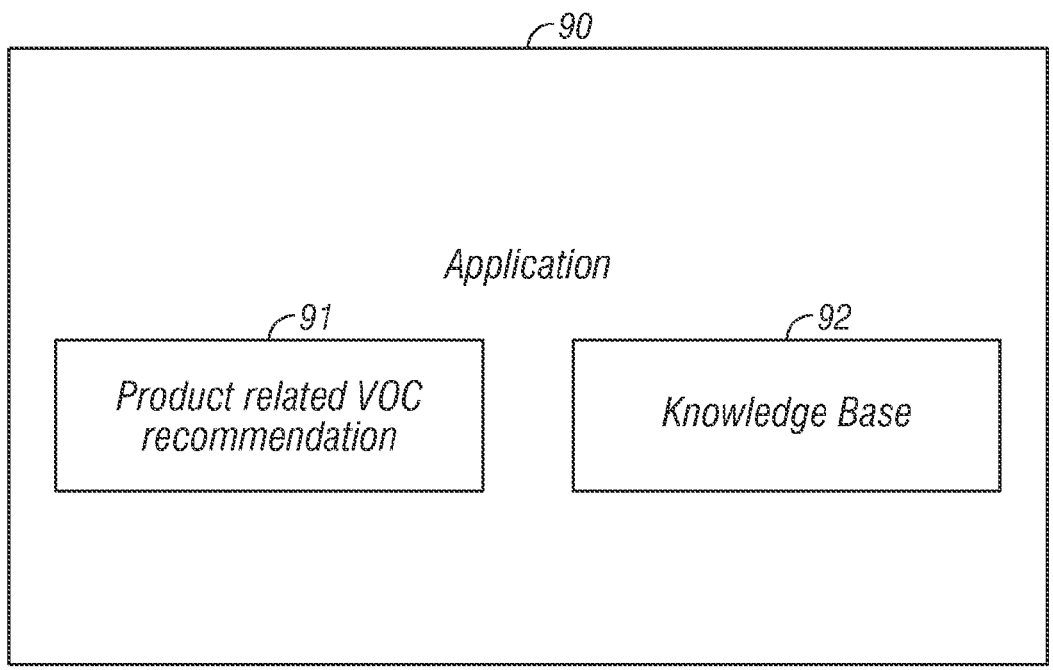
FIG. 9 is a block diagram showing different applications related to product-to-category mapping according to the invention.
Figure 10:
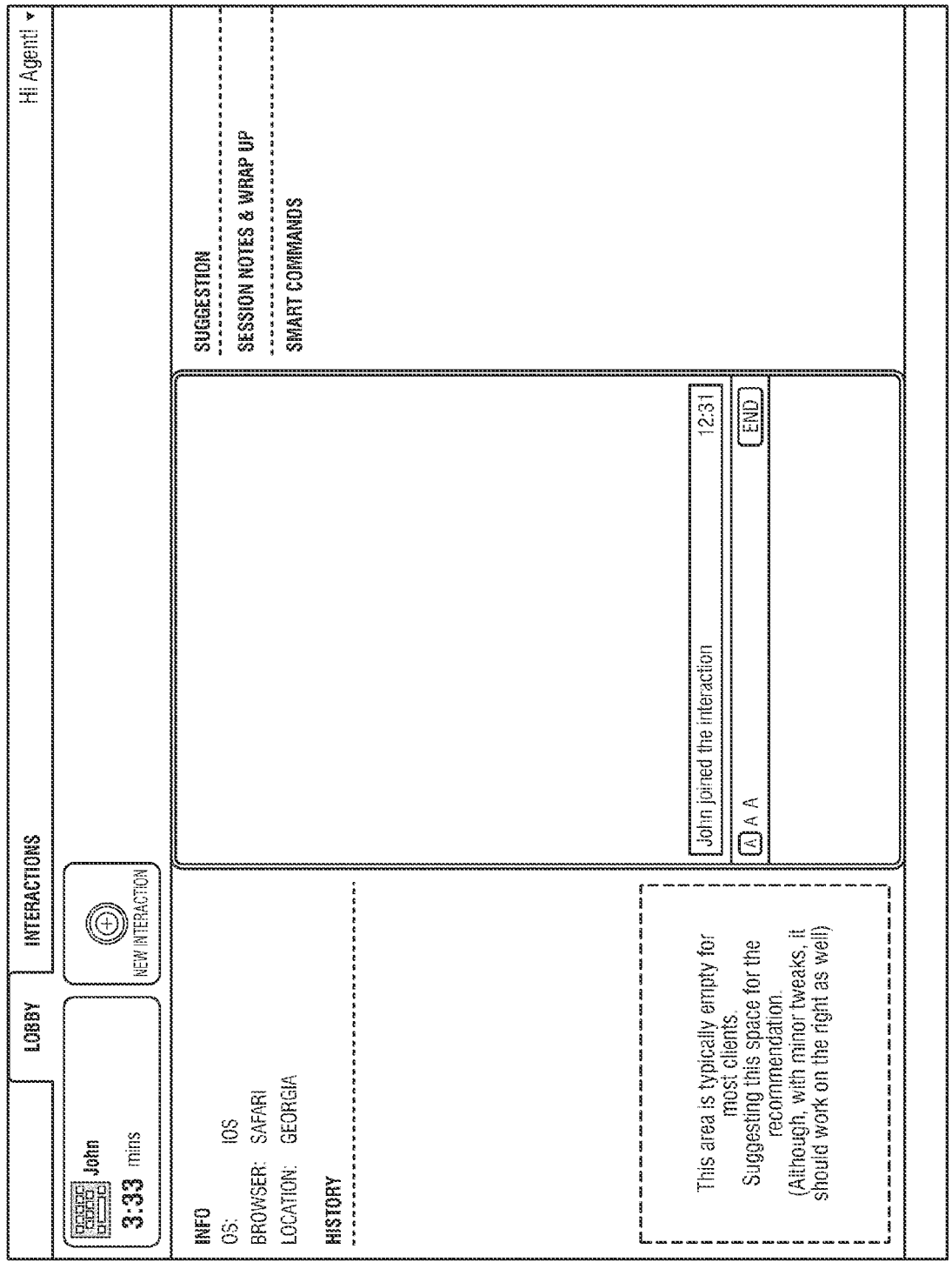
Figure 11:
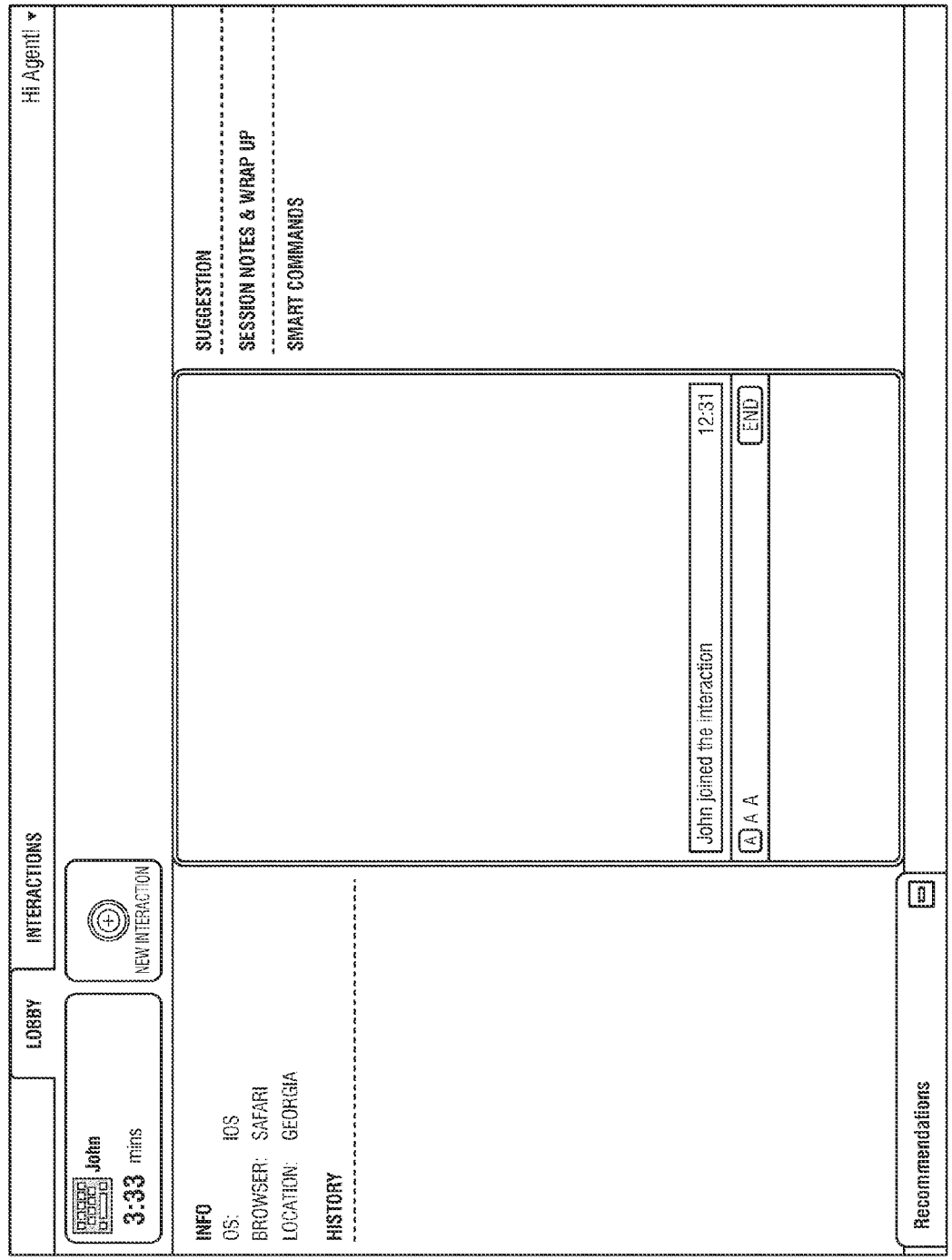
Figure 13:
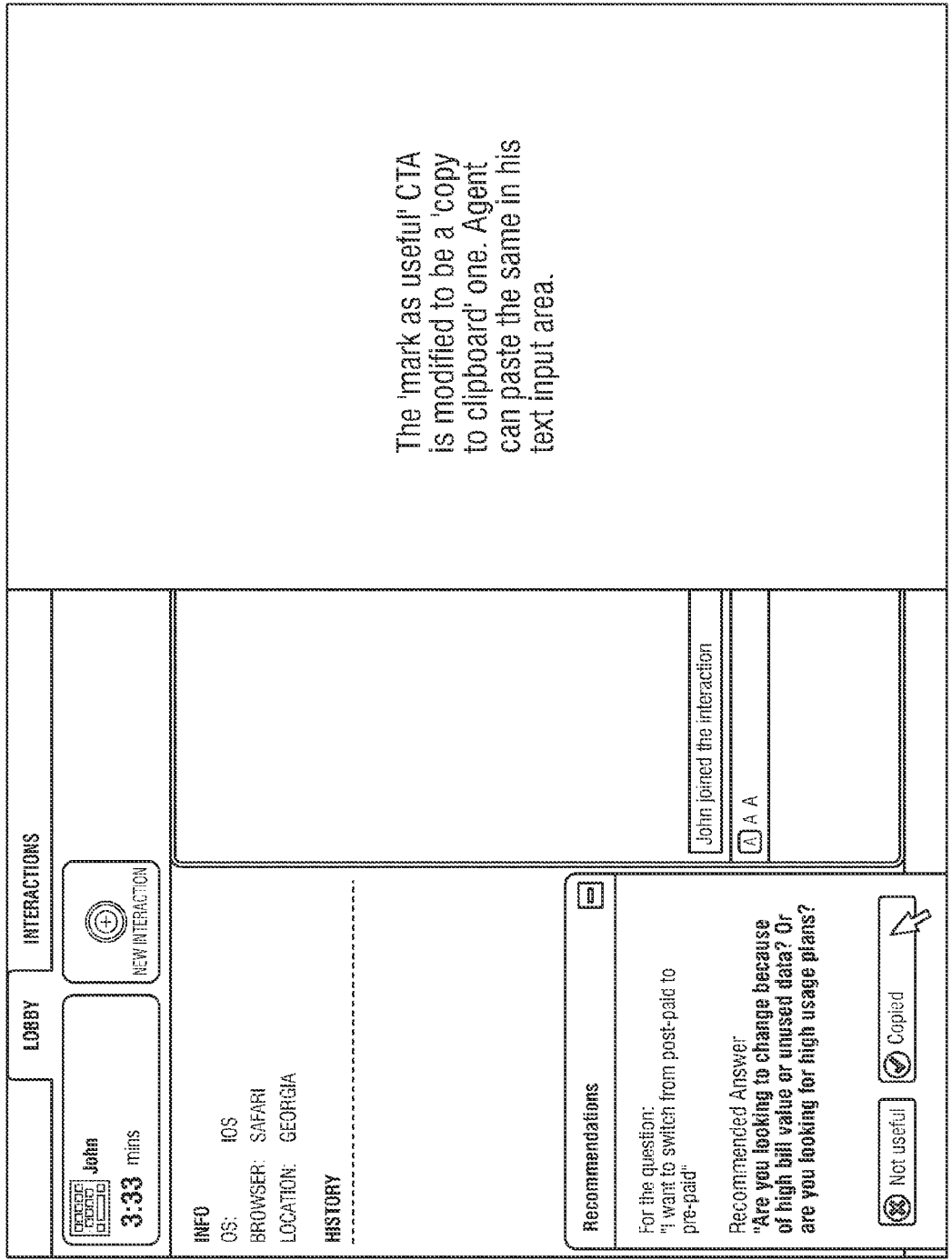
Figure 14:
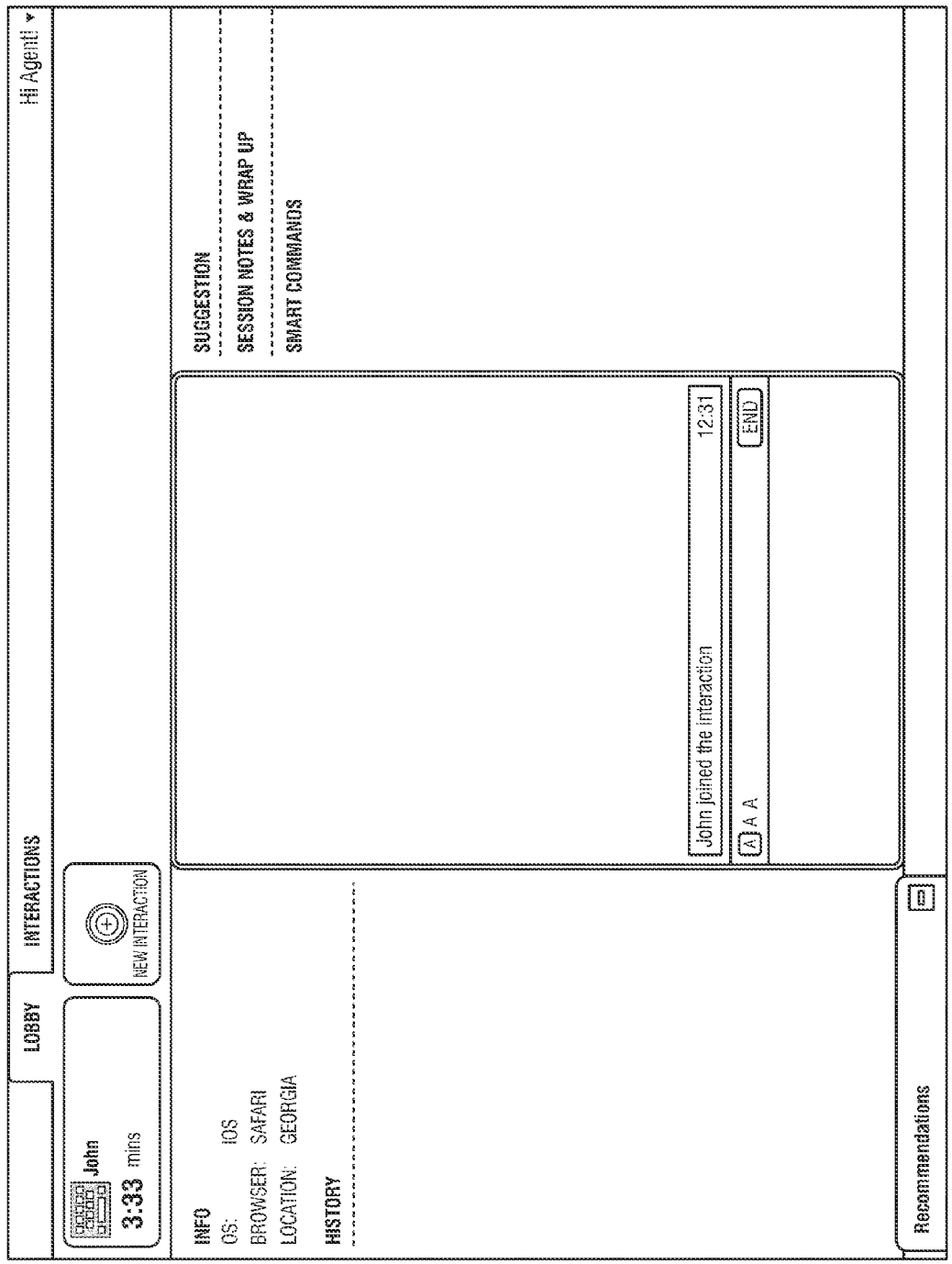

FIG. 9 is a block diagram showing different applications related to product-to-category mapping according to the invention. Once there is sufficient product information, promotions, offers, add-on offers, and related parts for the same chat conversations and/or any other interaction data between the client device 11 and the agent module 14 are text mined to create at least one correlation between these attributes and further leads for recommending actions to operations and for agent training. Examples of recommendations are: recommending a best product for cross-sell, suggesting the most popular product in a category, positives and negatives of a product, etc. In embodiments of the invention, this is an application 90 that is referred to as a product related VoC recommendation 91. The database 26 provides the product related VoC recommendation application, which may be executed by the data processing module 24.

In embodiments of the invention, the chat client provides access to a knowledge base 92 for agents contained in the database 26. The knowledge base recommends offers for the specific product category and related parts or products for the specific product category. For purposes of the discussion herein, related parts are parts that go in with each other, such as shoes and socks, or parts that are needed to function together, e.g. a motor and brushes. Further, the knowledge base provides competitor analysis and offers and deals for specific product categories, for example, using Google distance as a semantic measure. Using social media data, the pros and cons for a specific product category are also considered, along with the sentiment and subjectivity analysis for a specific product category, brand, and/or name, for example using any algorithm for sentiment analysis, text summarization, or review summarization.

In an embodiment of the invention, all of the recommendations are made at an aggregate level and, mostly, performed offline over time. Because the recommendation is preferably personalized to a specific user visit, the element of real time mining through web, chat, and social channels to generate more personalized recommendations is introduced through the category determination module 22.

Although, the above embodiments use chat as a medium to mine interaction data between the client device 11 and agent module 14 to thus determine appropriate categories, a person of ordinary skill in the art will appreciate that the invention disclosed herein can be practiced through other mediums, such as Web and social channels and the like.

Embodiments of the invention determine product categories in real time, so that not only are offline recommendations provided, but recommendations for both the customer and agent module 14 are also provided, based on the product category and names.

FIGS. 10-14 are mock-ups are user/agent interactions showing positioning (FIG. 10) of recommendation content, the recommendation being docked at the beginning of the chat as shown by minimized "recommendations" window (FIG. 11), the window sliding to show a recommendation after triggering of an event that identifies the product and product categories in the text typed by the customer or agent (FIG. 12), the interaction being marked as useful when the user (agent or customer) clicks on the "Copy to clipboard" button and it changes to "copied" (FIG. 13), and docking post-validation, where the "recommendations" window slides back to the minimized state, all according to the invention.

Computer Implementation

The embodiments disclosed herein can be implemented through at least one software program running on at least one hardware device and performing network management functions to control the network elements. The network elements shown in the figures include blocks which can be at least one of a hardware device, or a combination of hardware device and software module.

Figure 15:
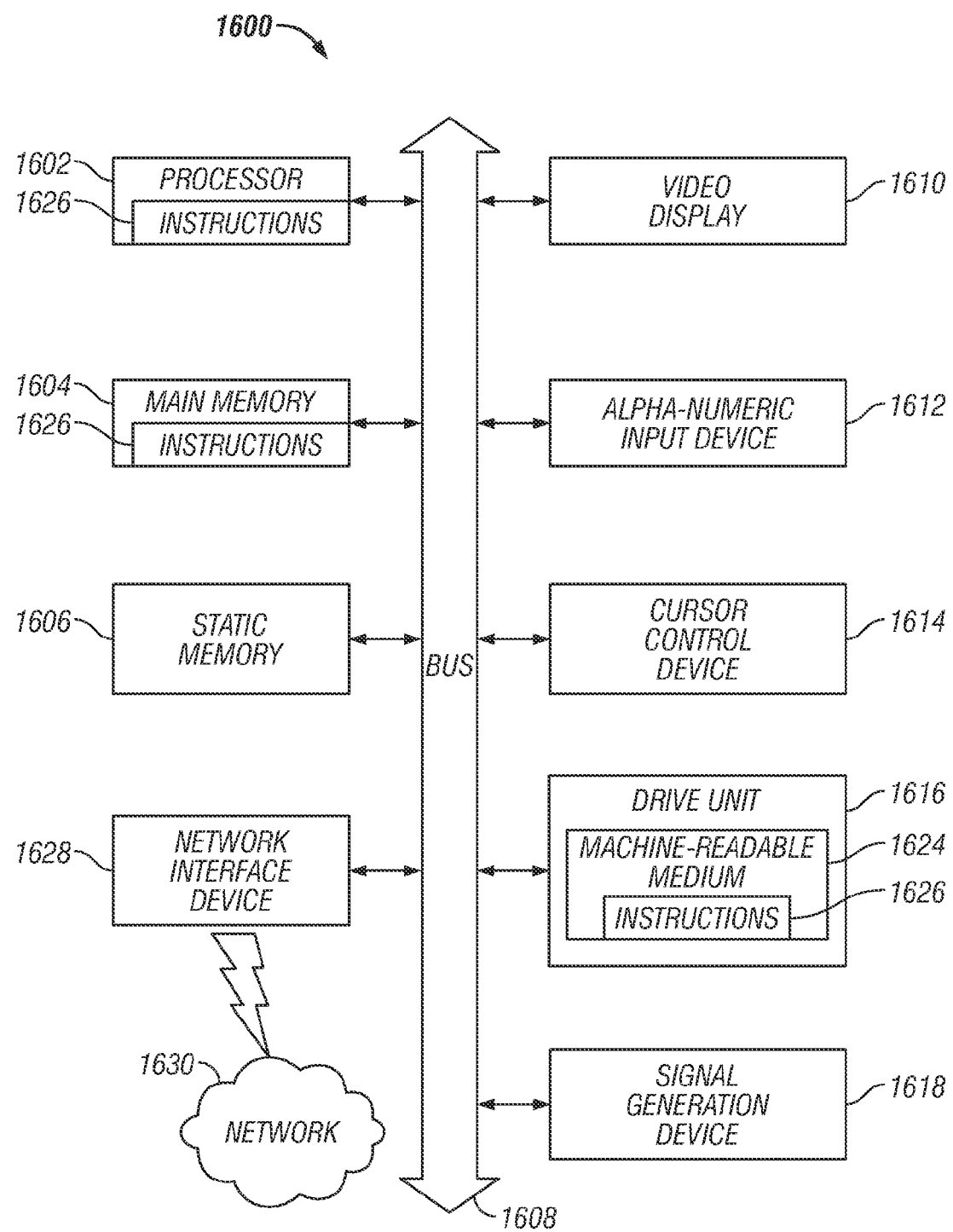
FIG. 15 is a block schematic diagram that depicts a machine in the exemplary form of a computer system within which a set of instructions for causing the machine to perform any of the herein disclosed methodologies may be executed.

FIG. 15 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant, a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602.

The software 1626 may further be transmitted or received over a network 1630 by means of a network interface device 1628.

In contrast to the system 1600 discussed above, a different embodiment uses logic circuitry instead of computer-executed instructions to implement processing entities. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for performing analysis of a user's interactions, the method comprising:
   providing a processor configured for text mining customer interaction data received via one or more user communication channels to establish abstract product categories;
   said processor configured for obtaining a query made by the user during a live chat communication with an agent;
   said processor configured for extracting keywords from the query that describe a product or a product attribute;
   said processor configured for mapping said keywords to one or more of the abstract product categories based on semantic relatedness between the keywords and the abstract product categories;
   said processor configured for inferring the user's intent based on the one or more abstract product categories;
   said processor configured for recommending at least one offer for the user based on the one or more abstract product categories and the user's intent; and
   said processor configured for updating the abstract product categories in real time as new customer interaction data is received via the one or more user communication channels.

2. The method of claim 1, wherein the one or more user communication channels include any of search queries, web interaction data, and chat streams.

3. The method of claim 1, further comprising:
   creating a chat transcript based on the live chat communication,
   wherein the chat transcript is a textual representation of a chat session between the user and the agent, and
   wherein the abstract product categories are based at least in part on a text mining of the chat transcript.

4. The method of claim 1, further comprising:
a client device communicating with an agent module via a network, wherein the client device is associated with the user and the agent module is associated with the agent,
wherein, during said communication with said agent module, the user, via said client device, discloses information that includes any of certain product related features, product names, and other product relevant information, and
wherein said information is contained in a transcript of a chat session between said user and the agent.

5. The method of claim 1, further comprising providing a Web server that comprises:
a collection module configured for:
collecting a historical data set recorded and received by a search engine, and
collecting keywords, specified categories, and a selection of various aspects tracked by the search engine;
a category determination module configured for managing determination of appropriate categories and query aspects for each of a plurality of categories and for identifying one or more appropriate categories to associate with search queries received by the search engine;
a data processing module configured for processing said historical data set collected by said collection module; and
a database configured for storing said appropriate categories and a top number of key words and tags associated with a search query.

6. The method of claim 3, further comprising:
initially extracting a primary line from said chat transcript, said primary line comprising data regarding an interaction between a client device associated with the user and an agent module associated with the agent;
passing said extracted primary line through a dependency parser which, in turn, outputs a parsed tree; and
based on said parsed tree, implementing a heuristic-based approach to extract a product name or other such relevant information from said chat transcript.

7. The method of claim 3, further comprising:
using a sentence splitter for pre-processing of the chat transcript.

8. The method of claim 3, further comprising:
post processing using any of stop-word removal, spelling correction, and domain specific word removal to obtain cleaner product related information.

9. The method claim 1, said mapping further comprising:
performing product-to-category mapping in which, once a product name and other relevant information is extracted from a chat session, said product name and said relevant information are mapped to an abstract product category to provide insights that are used to produce an actionable recommendation.

10. The method of claim 9, further comprising:
mapping specific domains that comprise entities through an ontology that provides different ontological relations that are used to map a product name, part, and information to product categories.

11. The method of claim 9, further comprising:
mapping a product name to a product category using a family of semantic distance measures, each semantic distance measure being derived from a number of hits returned by a search engine for a given set of keywords, wherein keywords having a same or similar meaning in a natural language sense are close in units of distance, and
wherein keywords having dissimilar meanings are farther apart; and
using said semantic distance measures to calculate semantic relatedness, wherein said semantic relatedness contributes to a mapping between a product name and a product category.

12. The method of claim 11, further comprising:
using a vocabulary as a metric to calculate semantic relatedness from where it is possible to map a product name to a product category.

13. The method of claim 3, further comprising:
text mining attributes, which include any of promotions, offers, add-on offers, and related parts for a same chat conversation, and any other interaction data between a client device associated with the user and an agent module associated with the agent to create at least one correlation between said attributes,
wherein said at least one correlation is subsequently used by said processor for recommending actions to operations and for agent training.

14. The method of claim 3, further comprising:
a chat client providing access to a knowledge base for agents, wherein said knowledge base recommends offers for a specific product category and related parts for said specific product category.

15. The method of claim 14, wherein said knowledge base provides competitor analysis, offers, and deals for specific product categories.

16. The method of claim 14, further comprising:
using social media data, considering pros and cons for a specific product category, along with sentiment and subjectivity analysis for any of a specific product category, brand, and name.

17. The method of claim 1, further comprising:
making said recommendation of at least one offer at an aggregate level and, when said at least one offer includes a plurality of offers, recommending said plurality of offers offline over time.

18. The method of claim 1, further comprising:
personalizing said recommendation of at least one offer to a specific user visit, wherein each element of real time mining through Web, chat, and social channels generates more personalized recommendations.

19. The method of claim 1, wherein said text mining utilizes a Normalized Google Distance (NGD) function to calculate semantic relatedness, and
wherein said updating of the abstract product categories in real time allows the abstract product categories to change over time.

20. The method of claim 1, further comprising:
said processor configured for using the abstract product categories and the user's intent for any of offline analysis, context passing to other channels of interaction, analyzing agent performance, and enhancing the user's experience.

21. An apparatus for performing analysis of a user's interactions, the apparatus comprising:
a processor; and
a memory that includes instructions, which, when executed by the processor, cause the processor to:
text mine customer interaction data received via one or more communication channels to establish abstract product categories;
obtain a query made by a user during a live chat communication with an agent;
extract keywords from the query that describe a product or a product attribute;

map said keywords to one or more of the abstract product categories based on semantic relatedness between the keywords and the abstract product categories;
infer the user's intent based on the one or more abstract product categories;
recommend at least one offer for the user based on the one or more abstract product categories and the user's intent; and
update the abstract product categories in real time as new customer interaction data is received via the one or more communication channels.

\* \* \* \* \*